United States Patent [19]

Cardon et al.

[11] 3,845,399

[45] Oct. 29, 1974

[54] DIGITAL DETECTOR OF AN ANALOG SIGNAL

[75] Inventors: Carlos D. Cardon; Lawrence P. Griffone, both of Salt Lake City, Utah

[73] Assignee: Sperry Rand Corporation, New York, N.Y.

[22] Filed: Aug. 30, 1973

[21] Appl. No.: 393,117

[52] U.S. Cl. .................. 328/138, 307/233, 307/295, 328/140, 328/167

[51] Int. Cl. ........ H03d 3/00, H03b 3/04, H03k 5/20

[58] Field of Search ............ 307/233, 295; 328/138, 328/140, 167; 324/78 D

[56] References Cited

UNITED STATES PATENTS

| | | | |
|---|---|---|---|
| 3,537,001 | 10/1970 | Friend | 328/138 |
| 3,543,172 | 11/1970 | Seppeler | 307/233 |
| 3,619,651 | 11/1971 | Aldrich | 307/233 |
| 3,757,233 | 9/1973 | Dixon | 328/138 |
| 3,761,809 | 9/1973 | Lockitt et al. | 328/140 |
| 3,769,583 | 10/1973 | Spencer et al. | 328/140 |

*Primary Examiner*—Stanley D. Miller, Jr.
*Attorney, Agent, or Firm*—Kenneth T. Grace; Thomas J. Nikolai; John P. Dority

[57] ABSTRACT

A circuit combination of integrated circuit (IC) digital devices for detecting an analog signal of a selected frequency and amplitude is disclosed. The circuit combination is a special-purpose digital filter of a predetermined bandwidth determined by the sample time $T_S$ duration and the low $F_L$ and high $F_H$ frequencies of the passable analog signal frequency having a carrier frequency $F_A$. The analog signal is initially tested for minimal amplitude and converted to a digital signal by a conventional comparator circuit. The pulses of the digital signal are counted over the sample time $T_S$ and compared to the passable bandwidth: if the analog signal frequency $F_A$ ($F_L$ $F_A$ $F_H$) is within the bandpass, i.e., passable, a first binary signal is produced; alternatively, if the analog signal frequency $F_A$ ($F_L > F_A > F_H$) is without the bandpass, i.e., not passable, a second binary signal is produced. Sample times continue throughout the detection-comparing operation to ensure a continuous filtering process.

3 Claims, 4 Drawing Figures

DIGITAL DETECTOR OF AN ANALOG SIGNAL

BACKGROUND OF THE INVENTION

Prior art detectors of an analog signal of a selected frequency and amplitude have been designed using an analog filter that passes only an analog signal of the selected frequency and amplitude followed by a full-wave or half-wave rectifier and then a Schmitt trigger. Because of the availability of inexpensive and reliable digital circuits it is desirable that previous analog techniques be replaced by digital techniques as proposed by the present invention.

SUMMARY OF THE INVENTION

In the digital filter of the present invention an analog input signal of a frequency $F_A$ is initially tested for minimum amplitude and then converted to a binary digital waveform which is edge detected to provide an output pulse for every cycle of the analog input signal. The first output pulse sets a sample time generator and the pulses are counted over the sample time $T_S$. If the pulse count is within the bandpass at any time during the sample time $T_S$ the counter and a binary decoder set a flip-flop to a True state. This flip-flop is sampled at the end of the sample time and the True output is transferred to a storage element which is switched to the True condition. The True condition of the storage element after a one pulse width delay time then resets the counter back to 0. A time generator synchronizer driven by the output of the edge detector is disabled if the condition of the storage element is True. During the next successive sample time $T_S$ the procedure is repeated with the counter counting the number of pulses from the edge detector. If the number of pulses counted is within the bandpass the binary decoder continues coupling a True condition to the storage element with the counter reset as before and the time generator synchronizer being disabled. If during the next sample time $T_S$ the counter counts a number of pulses without the bandpass the binary decoder couples a False output signal indicating that the analog input signal is of a frequency outside the bandpass. This False condition signal is delayed one pulse width to activate the time generator synchronizer in preparation for the next incoming pulse from the edge detector which incoming pulse intiates the sample time generator after which the detector-comparing operation is repeated.

DESCRIPTION OF THE PREFERRED EMBODIMENT

Figure 1:
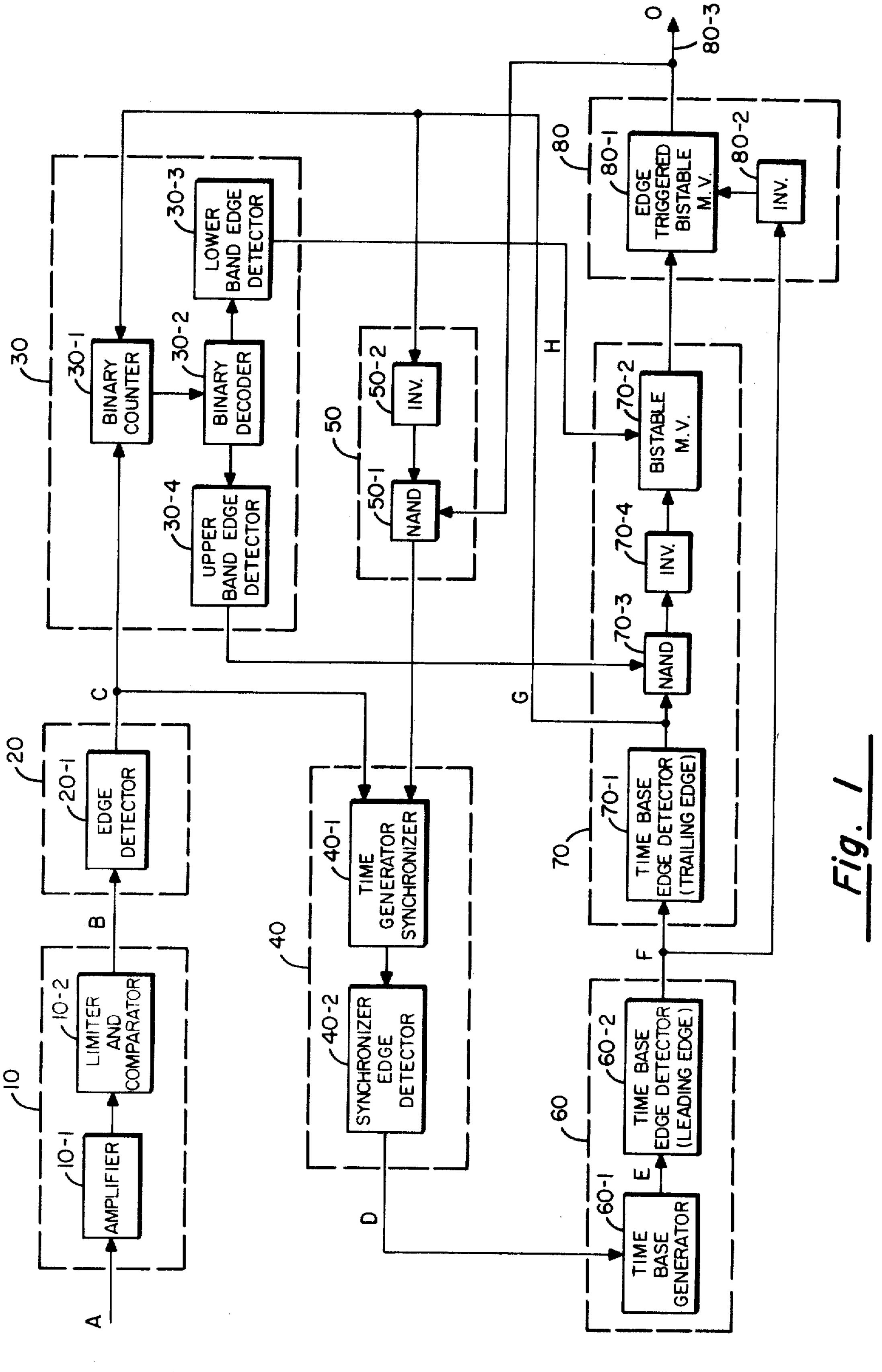
FIG. 1 is a block diagram of the special-purpose digital filter of the present invention.
Figure 2A:
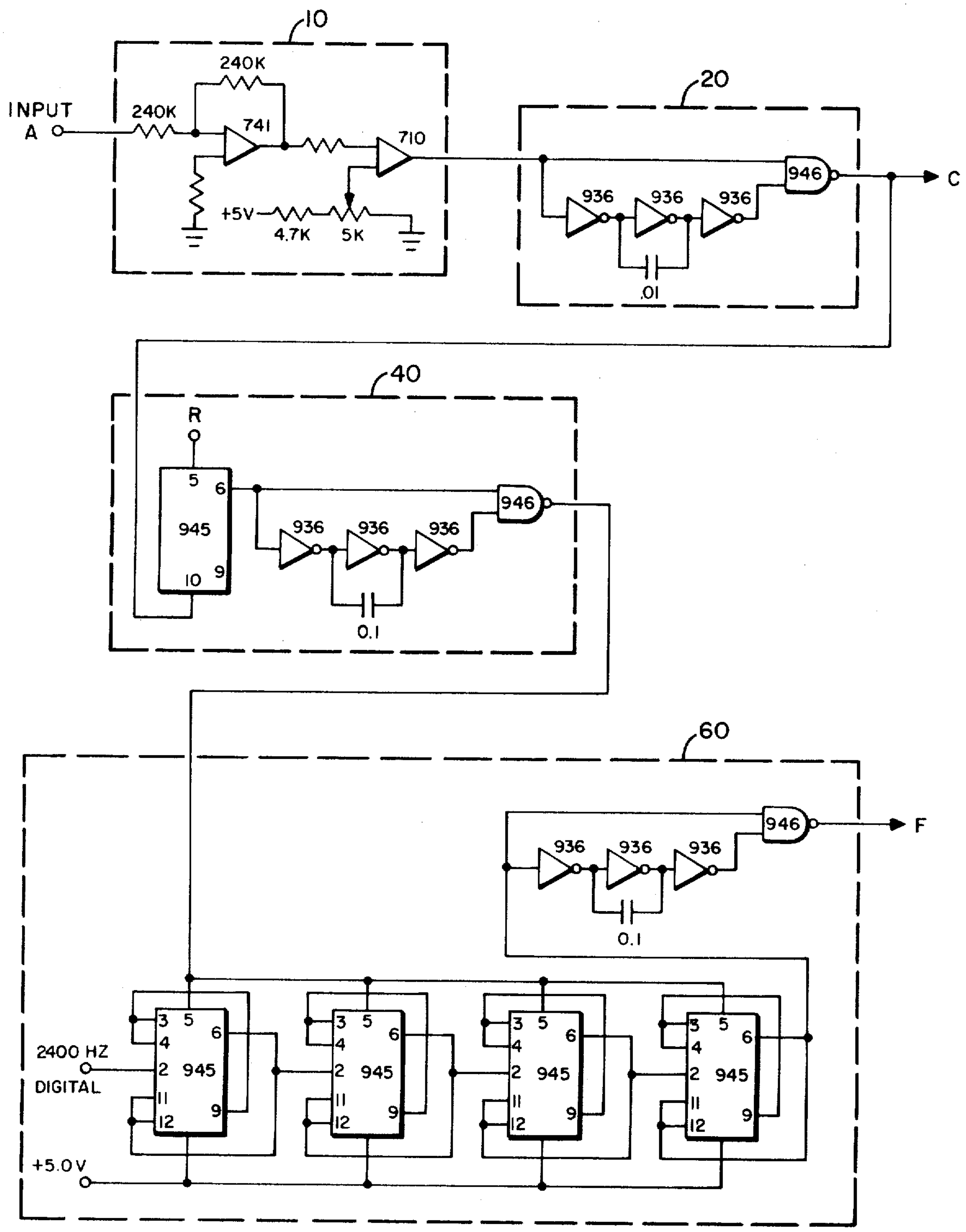
FIG. 2, consisting of FIGS. 2a, 2b, is a logic level drawing of the special-purpose digital filter of FIG. 1.
Figure 2B:
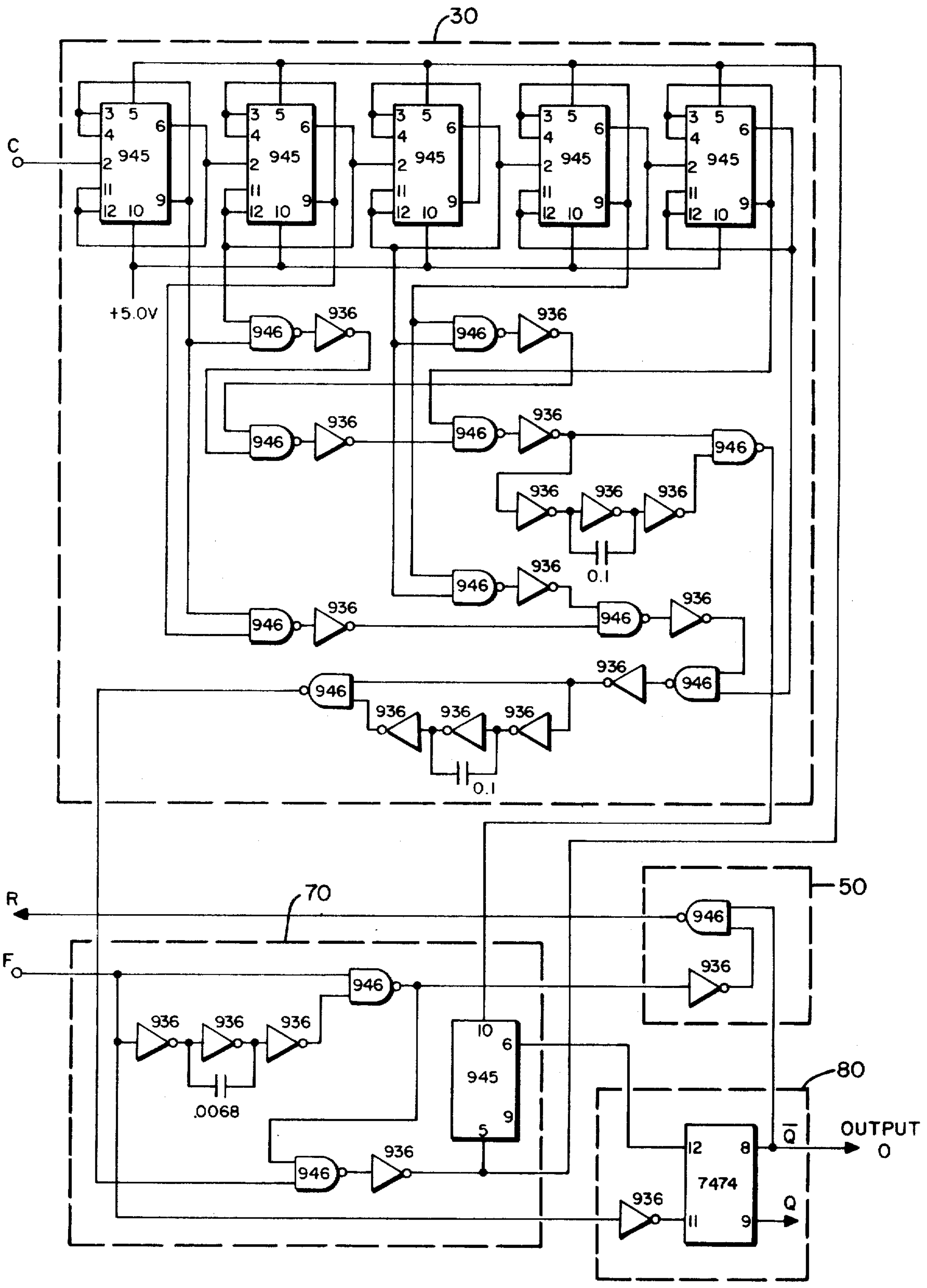

With particular reference to FIG. 1 there is presented a block diagram of the special-purpose digital filter of the present invention, the elements thereof being illustrated in detail at their logic level in FIGS. 2a and 2b. The special-purpose digital filter of the present invention basically establishes a fixed sample time $T_S$ during which the actual number $N_A$ of cycles or pulses of a sampled signal are counted. The number $N_A$ is then compared to the minimum number $N_L$ and the maximum number $N_H$ of cycles or pulses that define the bandpass width of the filter. If within that range, i.e., $N_L \leq N_A \leq N_H$ a first True signal is generated and if without the range, i.e., $N_L > N_A > N_H$, a second False signal is generated. The True and/or False signals are then set into a flip-flop and the flip-flop output is in turn clocked into the output storage element (flip-flop) at the end of the sample period. Thus the True condition of the output storage element indicates that a signal meeting the amplitude and frequency conditions is present at the input to the circuit. Conversely, the False condition indicates that the signal does not meet these conditions. Using the timing diagram of FIG. 3 to explain the operation of the present invention illustrated in FIGS. 1, 2a, 2b certain parameters shall be assumed by way of example to better illustrate the operation of the present invention in its preferred embodiments of FIGS. 2a, 2b:

$F_L = 900$ Hz $F_H = 3{,}000$ Hz $T_S = 1/1.5 \times 10^{-2}$ Hz $= 6.67 \times 10^{-3}$ sec.

Thus the sampled signal shall be sampled over a duration of $6.67 \times 10^{-3}$ sec. and if the sampled signal frequency $F_A$ is within the bandpass width, i.e., $N_L \leq N_A \leq N_H$, the filter shall generated a True signal output and, alternatively, if the sample signal frequency is without the bandpass width the filter shall generate a False signal output.

Figure 3:
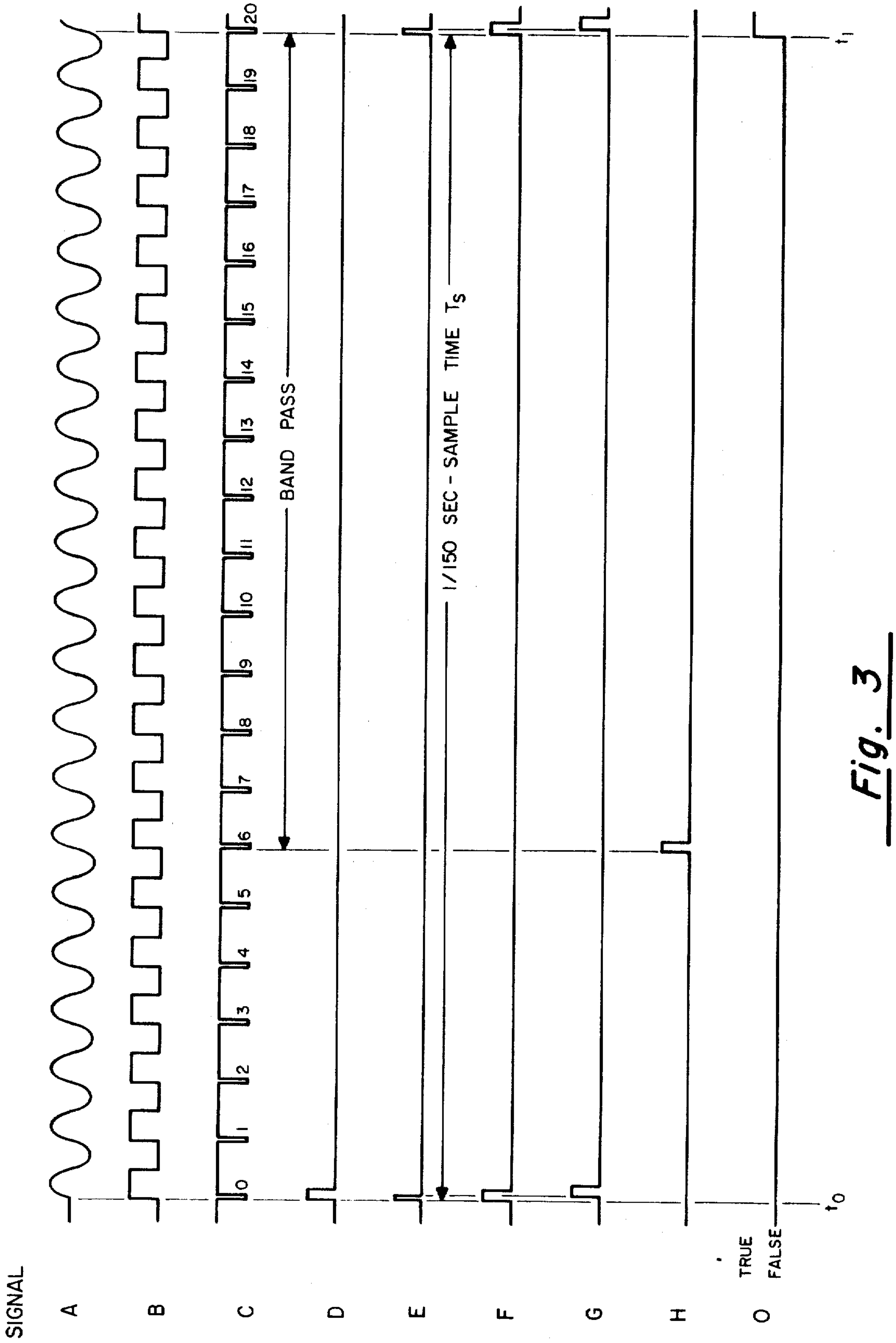
FIG. 3 is a timing diagram illustrating the operation of the special-purpose digital filter of FIG. 1.

Referring to the signal waveforms of FIG. 3, the analog signal A of a frequency $F_A$ is coupled to comparator 10. Signal A is initially coupled to amplifier 10-1 which is an isolation and threshold detector which compares signal A to a threshold level and if signal A is above the threshold level couples signal A to converter 10-2. Converter 10-2 converts the analog signal A of a frequency $F_A$ to the digital signal B. The digital signal B is then coupled to edge detector 20 which produces, as an output, signal C which consists of a single short duration output pulse for every complete input cycle of signal B. Signal C is, in turn, coupled in parallel to counter 30 and sample time controller 40. At binary counter 30-1 the pulses of signal C, beginning at time $t_0$, are counted with the running total count being decoded by binary decoder 30-2 which, in turn couples a decoder True signal to lower band edge detector 30-3 if the decoded binary count is equal to the lower bandpass and a decoder False signal to upper band edge detector 30-4 if the decoded binary count is above the upper bandpass. At sample time controller 40 the first pulse of signal C triggers time generator synchronizer 40-1 coupling a single short duration pulse to synchronizer edge detector 40-2 that couples the signal D to the sample time generator 60. Signal D triggers time base generator 60-1 to generate signal E which is, in turn, coupled to time base leading edge detector 60-2 which generates as an output therefrom signal F which is coupled to edge triggered bistable multivibrator or flip-flop 80-1 of memory element 80 by way of inverter 80-2 and to time base trailing edge detector 70-1 which generates an output signal G. Signal G resets the binary counter 30-1 to O and through NAND gate 70-3 and inverter 70-4 sets bistable multivibrator or flip-flop 70-2. At this time, edge triggered bistable multivibrator 80-1 of memory element 80 is coupling a relatively low level False state of output signal O to an output line 80-3 and as a first input to NAND gate 50-1 of synchronizer controller 50.

Counter 30 is set to a bandpass of a count of 6 – 20, and, accordingly, at the count of 6 binary decoder 30-2 couples a True decode pulse to lower band edge detector 30-3 which, in turn couples decode True signal H to bistable multivibrator 70-2 causing it to change its state. Binary counter 30-1 continues counting the subsequent pulses 7 – 19 of signal C causing lower band edge detector 30-2 to remain in its previously set True state.

At the end of the sample time $T_S$ time base generator 60-1 couples the second pulse of signal E to time base leading edge detector 60-2 which, in turn, couples the second pulse of signal F to edge triggered bistable multivibrator 80-1 by way of inverter 80-2 which gates the state of bistable multivibrator 80-2 therein causing memory element 80 to couple to its output line the relatively high level True state of output signal O and through NAND gate 70-3 and inverter 70-4 causes bistable multivibrator 70-2 to change to a False state. The concurrent application of the signal G and signal O at NAND gate 50-1 disables the time generator synchronizer 40-1.

Under the above described conditions the input signal A has been assumed to be within the bandpass of a pulse count of 6 – 20, e.g., $F_L = 900$ Hz, $F_H = 3{,}000$ Hz at a sample time $T_S$ of $6.67 \times 10^{-3}$ sec. If the count had been greater than 20 at time $t_1$, e.g., after sample time $T_S$ binary decoder 30-2 would have coupled the appropriate signal to upper band edge detector 30-4 which, in turn, would have coupled a decode False pulse to NAND gate 70-3 and inverter 70-4 which, in turn, would have changed the state of bistable multivibrator 70-2 which False state of bistable multivibrator 70-2 would have caused edge triggered bistable multivibrator 80-1 to couple the low level False state of output signal O to output line 80-3 when gated by inverter 80-2. Alternatively, if the count had been less than 6 at time $t_1$, e.g., after sample time $T_S$, binary decoder 30-2 would not have coupled any True decode signal to lower band edge detector 30-3 whereby no high level pulse of signal H would have been coupled to bistable multivibrator 70-2 causing edge triggered bistable multivibrator 80-1 to continue coupling the relatively low level False state of output signal O to output line 80-3 of memory 80 when triggered by inverter 80-2. With the output signal A continuing to be of a frequency $F_A$ within the bandpass, memory element A continues coupling its relatively high level True state of output signal O to its output line 80-3. However, as at the end of the sample time $T_S$ at time $t_1$ the second pulse of signal F from time base trailing edge detector 70-1 has reset binary counter 30-1 to O the above described sequence repeats itself testing the incoming signal A for its frequency $F_A$ to determine, if at any time, it is within or without the bandpass and to provide a corresponding high level True state or low level False state of output signal O on its output line 80-3.

What is claimed is:

1. A digital detector of an analog signal, comprising:

means receiving an input analog signal of a frequency $F_A$ for generating a digital signal of a frequency $F_A$ therefrom;

counting means coupled to said digital signal for counting the number of pulses $N_A$ thereof during a preset sample time $T_S$ and generating a decode True signal if the counted number of pulses is equal to or greater than a preset low $N_L$ number of pulses and generating a decode False signal if the counted number of pulses is greater than a preset high $N_H$ number of pulses for defining a preset bandwith $N_L \leq N_A \leq N_H$;

an output flip-flop for generating as the alternative output signals an output True signal or an output False signal indicating that said counting means has counted a number of pulses $N_A$ of said digital signal that is within or without, respectively, said preset bandwidth;

a decoder flip-flop responsively coupled to said decode True signal and said decode False signal for storing a decoder True signal or a decoder False signal;

means gating the decoder True signal or the decoder False signal from said decoder flip-flop into said output flip-flop for storing and generating an output False signal or an output True signal, respectively, on a detector output line therefrom.

2. A digital detector of an analog signal, comprising:

means receiving an input analog signal of a frequency $F_A$ for generating a digital signal comprising a series of short duration pulses of a frequency $F_A$, one pulse for every cycle of said input analog signal;

sample time base generator means coupled to said digital signal for generating, when effected by a first pulse of said digital signal, a sample time signal comprising a first sample time pulse and after the sample time $T_S$ a second sample time pulse;

counting means coupled to said digital signal for counting the number of pulses $N_A$ thereof during said sample time $T_S$ and generating a decode True signal if the counted number of pulses is equal to a preset low $N_L$ count and generating a decode False signal if the counted number of pulses is greater than a preset high $N_H$ count for defining a preset bandwidth $N_L \leq N_A \leq N_H$;

means coupling said sample time signal to said counting means for resetting said counting means to a zero count upon receipt of said first sample time pulse;

output memory means for generating as the alternative output signals an output True signal or an output False signal indicating that said counting means has counted a number of pulses of said digital signal that is within or without, respectively, said preset bandwidth;

decoder memory means coupled to said decode True signal and said decode False signal for coupling a decoder True signal or a decoder False signal to said output memory means;

means coupling said second sample time pulse to said output memory means for gating the decoder True signal or the decoder False signal from said decoder memory means into said output memory means and coupling an output True signal or an output False signal, respectively, therefrom on a detector output line.

3. The digital detector of claim 2 further including:

gating means coupled to said detector output line and said sample time base generator means for generating a new sample time signal when affected by an output False signal.

* * * * *

UNITED STATES PATENT OFFICE

CERTIFICATE OF CORRECTION

Patent No. 3,845,399 Dated October 29, 1974

Inventor(s) Carlos D. Cardon; Lawrence P. Griffone

It is certified that error appears in the above-identified patent and that said Letters Patent are hereby corrected as shown below:

IN THE PRINTED PATENT:

Data element [ 57 ], ABSTRACT, Front Page, Line 13,

"$F_A(F_L \quad F_A \quad F_H)$" should be -- $F_A(F_L \leqslant F_A \leqslant F_H)$ --.

Signed and sealed this 31st day of December 1974.

(SEAL)
Attest:

McCOY M. GIBSON JR.
Attesting Officer

C. MARSHALL DANN
Commissioner of Patents